(12) United States Patent
Goder et al.

(10) Patent No.: US 7,545,515 B2
(45) Date of Patent: *Jun. 9, 2009

(54) OBJECT SHAPING DEVICE

(75) Inventors: Claus Goder, Nuremberg (DE);
Thomas Hollerbach, Jena (DE);
Juergen Kuehnert, Jena (DE); Eckhard Schroeder, Eckental (DE)

(73) Assignee: Carl Zeiss Meditec AG, Jena (DE)

( * ) Notice: Subject to any disclaimer, the term of this patent is extended or adjusted under 35 U.S.C. 154(b) by 9 days.

This patent is subject to a terminal disclaimer.

(21) Appl. No.: 11/552,435

(22) Filed: Oct. 24, 2006

(65) Prior Publication Data

US 2007/0161973 A1 Jul. 12, 2007

Related U.S. Application Data

(63) Continuation of application No. 09/530,167, filed as application No. PCT/EP98/06626 on Oct. 20, 1998, now Pat. No. 7,128,737.

(30) Foreign Application Priority Data

Oct. 22, 1997 (DE) ................................ 197 46 483

(51) Int. Cl.
*G01B 11/24* (2006.01)
(52) U.S. Cl. ........................ 356/601; 356/445
(58) Field of Classification Search ................ 356/601, 356/445
See application file for complete search history.

(56) References Cited

U.S. PATENT DOCUMENTS

| 4,733,944 | A | 3/1988 | Fahlen et al. |
| 4,838,266 | A | 6/1989 | Koziol et al. |
| 4,911,711 | A | 3/1990 | Telfair et al. |
| 4,951,663 | A | 8/1990 | L'Esperance, Jr. |
| 5,061,342 | A * | 10/1991 | Jones .......................... 216/26 |
| 5,084,883 | A | 1/1992 | Khalid et al. |
| 5,091,626 | A | 2/1992 | Lewis et al. |
| 5,146,917 | A | 9/1992 | Wagnieres et al. |
| 5,204,773 | A | 4/1993 | Guida |

(Continued)

FOREIGN PATENT DOCUMENTS

DE 3914275 1/1991

(Continued)

OTHER PUBLICATIONS

Freund, et al. "Laserentlackung: Automatisierung von Anfang an." VDI-Z., Jun. 1997, No. 6, pp. 32-35.

(Continued)

*Primary Examiner*—Roy Punnoose
(74) *Attorney, Agent, or Firm*—Darby & Darby

(57) ABSTRACT

A device for shaping objects by removal of material from the surface thereof with a pulsed laser beam and a deflecting device through which the laser beam is guided over the surface of the object. An optical device is provided for changing the distribution of the radiation intensity inside the laser beam cross section. After the passage of the laser beam through this optical device, the radiation intensity has a bell-shaped or Gaussian distribution, or a distribution similar to a bell-shaped or Gaussian distribution, in at least one cross-sectional direction through the laser beam.

15 Claims, 4 Drawing Sheets

U.S. PATENT DOCUMENTS

| | | | |
|---|---|---|---|
| 5,231,624 A | 7/1993 | Finegan | |
| 5,284,477 A | 2/1994 | Hanna et al. | |
| 5,414,559 A | 5/1995 | Burghardt et al. | |
| 5,463,200 A | 10/1995 | James et al. | |
| 5,800,424 A | 9/1998 | Sumiya et al. | |
| 5,835,647 A | 11/1998 | Fischer et al. | |
| 5,906,608 A | 5/1999 | Sumiya et al. | |
| 5,938,656 A | 8/1999 | Schroder et al. | |
| 5,986,788 A | 11/1999 | Sasaki et al. | |
| 6,086,204 A | 7/2000 | Magnante | |
| 6,193,710 B1 | 2/2001 | Lemberg | |
| 6,285,001 B1 | 9/2001 | Fleming et al. | |
| 6,302,877 B1 | 10/2001 | Ruiz et al. | |

FOREIGN PATENT DOCUMENTS

| | | |
|---|---|---|
| DE | 4141890 | 7/1992 |
| DE | 4220705 | 1/1994 |
| DE | 4441425 | 8/1995 |
| DE | 4429193 | 2/1996 |
| DE | 19514679 | 7/1996 |
| DE | 19623749 | 5/1997 |
| DE | 19703661 | 8/1997 |
| EP | 0100242 | 2/1984 |
| EP | 151869 | 8/1985 |
| EP | 224322 | 6/1987 |
| EP | 0232037 | 8/1987 |
| EP | 0274205 | 7/1988 |
| EP | 0296497 | 12/1988 |
| EP | 0346116 | 12/1989 |
| EP | 0651982 | 5/1995 |
| JP | 07027993 | 1/1995 |
| JP | 9-066383 | 3/1997 |
| WO | 97/43078 | 11/1997 |
| WO | 00/10049 | 2/2000 |

OTHER PUBLICATIONS

Mrochen, M. & Seiler T., International Ophtalmology Clinics, "Advances in Refractive and Corneal Surgery" vol. 36. No. 3, p. 73-75, Fall 1996.

Mrochen et al., "Light Shaping Beam Homogenizing (LSBH) For Medical Applications", Abstract and Poster to LALS '96, Jenaer Congress in Sep. 1996.

Bronstein et al., "Taschenbuch der Mathematik"; Nachdruck 20. Auflage, 1983.

Datenblatt 1, of the Firm AMS Mikrooptik GmbH, Mar. 4, 1997.

Prospect of the Firm AMS Mikrooptik GmbH.

T Seiler and J Wollensak, "Fundamental mode photoablation of the cornea for myopic correction", Lasers and Light in Ophthalmology vol. 5 No. 4, pp. 199-203, 1993, Kugler Publications, Amsterdam/New York.

* cited by examiner

OBJECT SHAPING DEVICE

FIELD OF THE INVENTION

The invention relates to a device for sculpting or shaping objects by removal of material from the surface thereof with a pulsed laser beam and a deflecting device through which the laser beam is guided over the surface of the object. It is advantageously suited for shaping natural optical lenses of biological substance or for shaping artificial optical lenses.

BACKGROUND

Known prior art includes various devices and methods which are suitable for removal of material from the surface of an object by means of laser radiation and accordingly for shaping these objects, for example, for ablating tissue in the corneal region of the eye and for ophthalmologic shaping of eye lenses.

The first publications on influencing visual deficiency of the human eye by changing the convexity or concavity of the cornea date from around 1983 to 1985. Comparatively more corneal tissue must be removed in the center of the eye lens than in the peripheral areas in order to achieve flattening and, as a result, a correction of nearsightedness. However, if more corneal tissue is removed at the periphery than in the center, the curvature of the cornea is increased in order to correct farsightedness.

As a result, different amounts of biological substance are to be removed depending on the indication of individual surface portions of the cornea. In addition, the quantity of substance to be removed per time unit can vary depending on the extent of the correction required and depending on the progress of treatment; for example, a larger amount is to be removed in the first stage of treatment than in the concluding stage of precision treatment during which the main concern is to achieve smooth surfaces on the corrected curvature.

An essential factor for the quantity removed per time unit and accordingly also for a changeable defined rate of removal is, for one, the intensity of laser radiation itself, i.e., the energy introduced into the material to be removed by the radiation, and also the intensity distribution over the cross section of the laser radiation or in the spot applied to the surface of the object with every laser pulse. If the intensity distribution in the radiation cross section varies, the amount removed over the cross-sectional area will also vary.

Differing amounts to be removed across the cross-sectional area is desirable, for instance, when less material is to be ablated at the edges of the cross section or spot than in a central radiation area because, in this way, the formation of steep edge regions in the remaining material can be avoided.

The radiation emanating from an excimer laser has a rectangular cross section in which, intensity fluctuations aside, a more uniform intensity distribution is given in the direction of the greater cross-sectional length than in the direction of the shorter cross-sectional side oriented at right angles to the first direction, where the intensity falls in a bell-shaped or Gaussian shape from the center of radiation to the edges. Elaborate steps are required in order to homogenize the radiation in a cross-sectional direction or also within the entire cross section. Homogenizing by means of scattering plates followed by diaphragms and through the use of abrasive diaphragms is known, for example.

Devices for homogenizing radiation intensity especially in excimer laser radiation are described, for example, in DE 42 20 705, JP 07027993, EP 0 232 037, and EP 0 100 242. The arrangements shown in these references serve to distribute the radiation intensity as uniformly as possible over the entire radiation cross section. However, a uniform intensity over the entire cross section would mean a pot-shaped intensity distribution, namely, that the intensity rises or falls very steeply in the edge regions of the laser beam. If laser radiation of this kind is guided over the surface of the object to be treated according to the spot scanning principle, the pot-shaped intensity distribution results in a step formation in the remaining material in the boundary areas from spot to spot. Steplike irregularities of this kind on the cornea lead to troublesome optical phenomena in sensory perception.

OS-DE 44 29 193 A1 describes another device for generating a cross-sectionally homogenized laser beam and the use of this radiation for removal of material. In this case, a pulsed laser radiation emanating from a solid state laser is guided through an optical fiber and mode-homogenized in this way. It is disadvantageous that the arrangement described in this reference is not suitable for spot scanning, i.e., it is possible to treat only relatively large surface portions (spots) in their entirety.

References to whole-surface ablation of the cornea with a solid state laser with Gaussian intensity distribution in the radiation cross section are contained in the article "Fundamental Mode Photoablation of the Cornea for Myoptic Correction," T. Sailer and J. Wollensack, Laser and Light in Ophthalmology, Vol. 5, No. 4, pp 199-203, 1993. The procedure described therein assumes that a laser of this kind delivers a spatially homogeneous radiation in the fundamental mode $TEM_{00}$. However, only a portion of the radiated energy is available in the fundamental mode $TEM_{00}$, this portion not being sufficient, for example, for corneal ablation.

SUMMARY OF THE INVENTION

The object of the invention is to develop further a device of the type described above in such a way that sculpting or shaping can be carried out quickly and effectively and remainder of bothersome microstructures on the surface of the object is avoided.

According to the invention, this object is met in that an optical device is provided for changing the distribution of the radiation intensity inside the laser beam cross section and, after the passage of the laser beam through this optical device, the radiation intensity has a bell-shaped or Gaussian distribution, or a distribution similar to a bell-shaped or Gaussian distribution, in at least one cross-sectional direction through the laser beam.

In contrast to the application of mutually overlapping spots with pot-shaped radiation intensity distribution on the surface to be ablated, as is known according to the prior art, the invention has the advantageous that a very smooth overall surface can be realized very quickly when spots with a Gaussian intensity distribution overlap. No steplike, steep structure remains on the surface; therefore, subsequent treatment of the surface is required only to a limited extent or not at all. As a result, the treatment time can be substantially reduced especially in the correction of curvatures of the cornea with the use of the device according to the invention. Moreover, compared with the prior art, the invention has the advantage that removal is possible not only over the entire surface, but can also be carried out in a locally limited manner on small portions of the surface based on the scanning principle.

In an arrangement of the invention, it is provided that the optical device comprises at least one optical element which can be selectively introduced into or removed from the laser beam path for the purpose of changing the intensity distribution, wherein the at least one optical element is provided with a diffractive and/or refractive and/or holographic microoptically active structure which is suitable for influencing the intensity distribution in the laser radiation cross section.

The optical element contained in the optical device or a plurality of optical elements provided in the optical device is/are provided with a microoptically active structure which is suitable for influencing the intensity distribution within the laser radiation. In this connection, the structure is applied to the optical element, for example, by electron-beam or photolithography processes, so that the optical element has a microoptically active vertical profile, a variation in the index of refraction extending over its cross-sectional area and/or a variation in absorption. The reflection and/or transmission of light waves is deliberately influenced by the selection of the structural configuration. For example, the structures can be stripe-shaped, cruciform, funnel-shaped or some other shape of depression and/or raised portion on a surface of the element.

As a rule, the optical element or optical elements are made of silicon, glass or plastic. The optically active surface can be spherical, aspherical, cylindrical or elliptical. Optical elements with structures of this kind have a high efficiency in the redistribution of radiation intensity within the laser beam.

Accordingly, an optical element can be provided which generates a radially symmetric intensity distribution within the laser beam cross section in which an intensity maximum is present in the center of the cross section and an intensity falling in a bell-shaped or Gaussian manner is present proceeding from the center to the edge regions.

The arrangement according to the invention is applicable in connection with a wide variety of different laser systems at wavelengths from the UV to the IR range. The optimum shape and distribution for treatment are achieved irrespective of the beam shape emanating from the laser and of the intensity distribution in the laser beam. For example, a noncircular laser beam exiting, for instance, from an excimer laser with inhomogeneous intensity distribution is transformed by the optical element into a round beam with homogeneous intensity distribution by which, finally, an optimum removal of material from the surface of the object can be carried out.

If the laser beam has, for example, a rectangular cross section of approximately 10 mm×30 mm as is used for photo refractive keratectomy (PRK) or for the LASIK method. In a section parallel to the longer side of this rectangle, the intensity profile of the laser radiation is approximately trapezoidal with intensity fluctuations that are referred to as "hot spots". Viewed in the direction of the shorter side length, the intensity profile is roughly bell-shaped or Gaussian. By arranging one of the optical elements in the laser beam path according to the invention, the intensity profile in every section direction through the radiation axis assumes a bell shape or Gaussian shape.

It lies within the framework of the invention to carry out an arrangement in which the optical element generates a radially symmetric intensity distribution within the laser beam cross section in which an approximately equal intensity is present in a circular central cross-sectional area and an intensity falling in a bell shape or Gaussian shape is present from the central cross-sectional area to the edge regions of the laser beam.

As a result of this extensively constant intensity in the core area of the laser beam, a high removal rate is achieved in the center, while the bell-shaped or Gaussian drop in intensity toward the edge regions produces the transition to the next spot in an advantageous manner insofar as a step-shaped structure is avoided in the transition zone.

Alternatively, it can be provided that the optical device contains at least one optical element which is provided for generating different intensity distributions in different cross-sectional directions through the laser beam. Accordingly, it is conceivable that the optical element is formed in such a way that, in two sections through the laser beam which are perpendicular to one another, an at least approximately Gaussian intensity distribution is achieved in one section and an at least approximately homogeneous intensity distribution is achieved in the second section. The deflecting direction of the laser beam and the cross section with the homogeneous intensity distribution should advantageously be oriented at right angles to one another.

In a very advantageous construction of the invention, the optical device can comprise a plurality of optical elements which can be introduced into the laser beam simultaneously or successively in time. This results in the advantage that the intensity distribution within the beam path can be changed during the treatment, i.e., during the removal of material from the surface or also during short interruptions in treatment, so that the beam shape and/or the intensity distribution can meet the various requirements as they arise during treatment.

In this connection, the optical elements can advantageously be arranged together on a movable carrier and they can be introduced into the beam path or removed from the beam path by the movement of the carrier. In this way, exchange is made possible in an uncomplicated manner, wherein the common carrier can be a rotatable exchange wheel which is mounted so as to be rotatable about an axis of rotation oriented parallel to the beam direction and on which the optical elements are arranged along a partial circle. Accordingly, by turning the exchange wheel by a rotational angle corresponding to the arc distance between two optical elements on the partial circle, two elements in the beam path can be interchanged easily.

As a rule, an objective is provided in the beam path of the laser beam, the size of the spot area being determined by the objective. In a preferred embodiment of the invention, a variable optical system is provided in the beam path of the laser beam for changing the size of the spot area directed onto the surface of the object. Accordingly, spots of different sizes can be realized during treatment, so that, for example, a coarse scanning of the surface with a large spot can be carried out first and, after correspondingly changing the adjustment of the variable system, a precision treatment can be carried out with smaller spots. It is also conceivable to carry out a concluding treatment for the purpose of smoothing the entire surface with a very large spot which extends over the entire area to be treated.

The size of the spot area directed onto the surface of the object, the deflection angle for the laser beam between two consecutive pulses and the pulse frequency of the laser beam should advantageously be adapted to one another in such a way that the spots applied adjacent to one another on the object surface overlap by about 30%. A relatively smooth surface having no steplike raised portions is therefore already achieved.

In this respect, a very preferable arrangement of the invention consists in that the variable system and/or the exchange wheel are provided with electronically controllable actuating drives whose control inputs, along with the control input of the deflecting device for the laser beam, are connected with outputs of a control unit, wherein preset data for the size of the spot area and/or for the rotating movement of the exchange wheel and/or for the deflecting angle of the laser beam between two pulses or the distance between two spot areas are applied to the outputs of the control unit.

In this way, it is advantageously possible for the individual presets affecting the removal rate or quality of the surface to be achieved to be changed in an uncomplicated manner during treatment or during short interruptions in treatment. The change in the presets can be carried out depending on the achieved quality of the surface.

For treatment of the cornea of the eye in particular, the device according to the invention can be outfitted with a device for detecting actual values of curvature of individual surface portions and/or of the entire surface to be treated, this device being coupled with an actual-value storage. In this way, it is possible to determine intermediate results in a qualitatively exact manner and to draw conclusions therefrom with regard to further treatment. Further, the control unit can be connected with the actual-value storage on the input side and a computation circuit can be provided in the control unit for determining preset data for the size of the spot area and/or for the rotating movement of the exchange wheel and/or for the deflecting angle of the laser beam from the comparison of the actual values with the reference values which are entered, for example, via a separate interface.

The invention is further directed to a process for shaping objects through material removal from the surface of the object by means of a pulsed laser beam which is guided over the object surface, wherein the distribution of the radiation intensity within the laser beam and/or the size of the spot area with which the laser beam strikes the object surface and/or the deflecting angle for the laser beam are changed during the shaping.

An advantageous arrangement of this process is provided in that the material removal is carried out with a small spot area at the start of the shaping and the material removal is carried out with an increasingly large spot area at the end of the shaping. Accordingly, in the final phase of shaping, the material removal is carried out with a spot area whose size corresponds to the total size of the object surface to be treated.

Further, it is advantageous when the material removal is carried out with a pot-shaped intensity distribution at the start of shaping and material removal is carried out with an increasingly Gaussian intensity distribution at the end of shaping.

Within the framework of the invention, there is also a process for determining geometric changes at the surface of objects during operation of a device according to the preceding description in which a curvature measurement of individual surface portions and/or of the entire surface to be treated is carried out before, during and/or immediately after material removal. In this way, it is advantageously possible to evaluate the results of operation with the above-mentioned device or the results of the material removal of the object surface. This is advantageous particularly when this device and its embodiments are applied for the purpose of treating the human cornea.

The process according to the invention can be arranged in such a way that a measurement beam path or a plurality of measurement beam paths is/are directed onto the surface of the object for the purpose of curvature measurement, wherein the surface of the object detects the reflections of these measurement beam paths by means of a detector device and curvature values are determined therefrom by means of an evaluating device. The measurement beam paths should have an intensity and a wavelength which, in contrast to the treatment beam path, cause no changes at the surface of the object. Arrangements of this type, often referred to as topography systems, are known and will therefore not be discussed in further detail.

Another arrangement of the process according to the invention provides that the determined curvature values for the entire surface or for individual surface portions are used as actual values as the basis for a comparison with reference values. In this way it is possible to draw conclusions directly based on the current treatment state during the material removal in order to achieve the aim of the treatment. In this respect, the process according to the invention can be further configured in such a way that preset data can be obtained from a comparison of the actual values with reference values of the surface configuration for a subsequent material removal which is limited with respect to time, wherein the deflecting angle of the laser radiation between two successive pulses and/or the size of the spot area on the object surface and/or the exchange of an optical element in the beam path by the rotating movement of the exchange wheel is predetermined with the preset data.

BRIEF DESCRIPTION OF THE DRAWINGS

The device according to the invention and the process according to the invention will be explained more fully in the following with reference to an embodiment example. Shown in the accompanying drawings are.

DETAILED DESCRIPTION OF THE PREFERRED EMBODIMENTS

Figure 1:
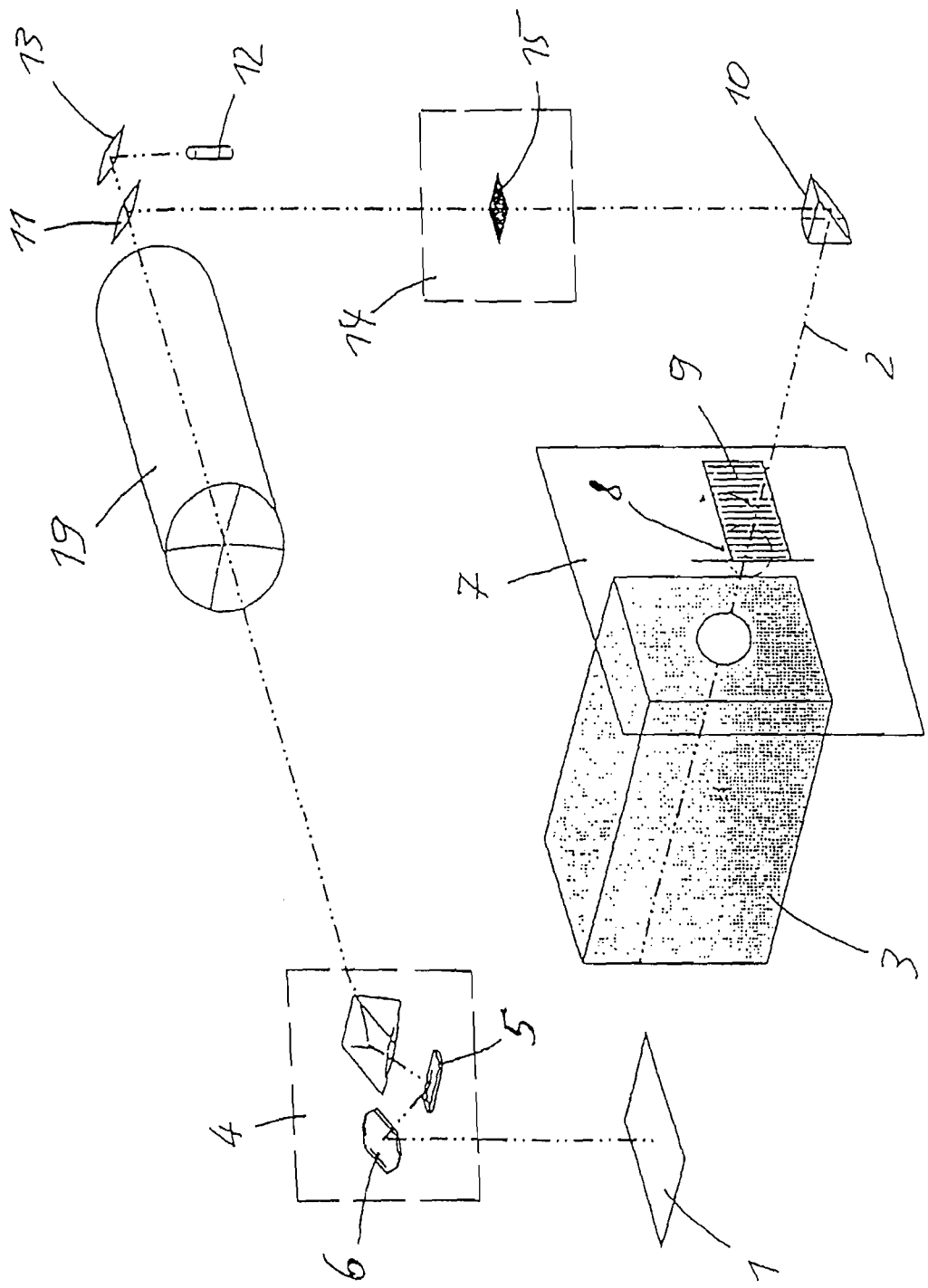
FIG. 1 a schematic view of the optical system of the device.

FIG. 1 shows a device for shaping an object 1 by means of a pulsed laser beam 2 emanating from an excimer laser 3. The laser beam 2 is guided over the surface of the object 1 by means of a deflecting device 4 in which an X-scanner mirror 5 and a Y-scanner mirror 6 are provided. The energy entering the surface of the object 1 through the laser beam 2 causes an ablation of material. The object 1 can be, for example, a human eye whose cornea is being treated by ophthalmologic shaping in order to correct deficient vision. However, the device according to the invention can also be applied, for example, for shaping artificial lenses which are provided for the correction of deficient vision.

The laser beam 2 emanating from the excimer laser 3 is guided through a containment wall 7 with windows 8 and attains the surface of the object 1 via a variable attenuator 9, a deflecting prism 10, an optical splitter 11 and via the deflecting device 4.

For the purpose of visual observation of the target area on the surface of the object 1, a target beam emitted by a laser diode 12 with a wavelength 635 nm is coupled into the laser beam 2 via a deflecting mirror 13 and the optical splitter 11.

The laser beam 2 emanating from the excimer laser 3 has a rectangular cross section. Typically, the radiation intensity is not homogeneously distributed within this rectangular cross section. While the intensity profile in the direction of the longer side of the rectangle is roughly trapezoidal with intensity fluctuations, the intensity profile in the direction of the short side of the rectangle is roughly Gaussian or bell-shaped.

In order to influence the distribution of the radiation intensity within the laser beam 2 in such a way that an optimum removal of material from the object surface can be carried out, an optical device 14 for influencing the intensity distribution within the radiation cross section is provided according to the invention in the laser beam path, namely, in such a way that, after passing through the optical device 14, the intensity has a bell-shaped or Gaussian distribution, or a distribution similar to a bell shape or Gaussian shape, no longer only in one section direction but in a plurality of section directions.

An optical element 15, for example, is located in the optical device 14 in the beam path on which is formed an optically active surface with a diffractive microoptic structure which causes an influencing of the intensity distribution in the sense described above when the laser beam 2 passes through.

Figure 4:
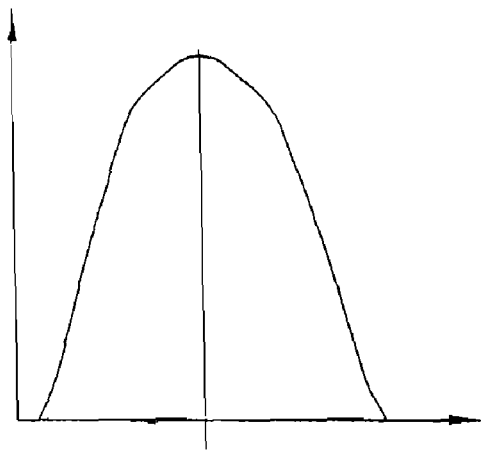
FIG. 4 Gaussian intensity distribution in the beam cross section.
Figure 5:
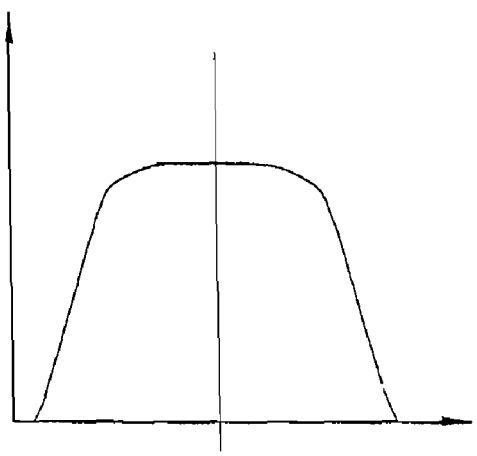
FIG. 5 intensity distribution with approximately equal intensity in a central cross-sectional area and intensity falling in a bell-shaped or Gaussian mariner from the central cross-sectional area to the edge regions.

Depending on the shape of the microoptic structure, for example, a radially symmetric intensity distribution can be present within the beam cross section after passing through the optical element 15, wherein an intensity maximum is present only in the center of the beam cross section and an intensity falling in a bell-shaped or Gaussian manner is present from the center to the edge regions (see FIG. 4). The cross section of the laser beam is now extensively circular. Alternatively, an optical element 15 can be provided with a structure, for example, through which a radially symmetric intensity distribution is likewise achieved, but in which an approximately homogeneous intensity distribution is present in a central cross-sectional region of the laser beam extending over a surface area and an intensity falling in a bell-shaped or Gaussian manner is present from this central area to the edge regions (see FIG. 5).

In order to ensure optimal material removal it may be required in the different stages of treatment of the surface of the object 1 to change the intensity distributions in the laser beam 2 before proceeding with treatment. The invention makes this possible in that the optical device 14 contains a plurality of different optical elements 15 which can be introduced selectively into the beam path.

Figure 2:
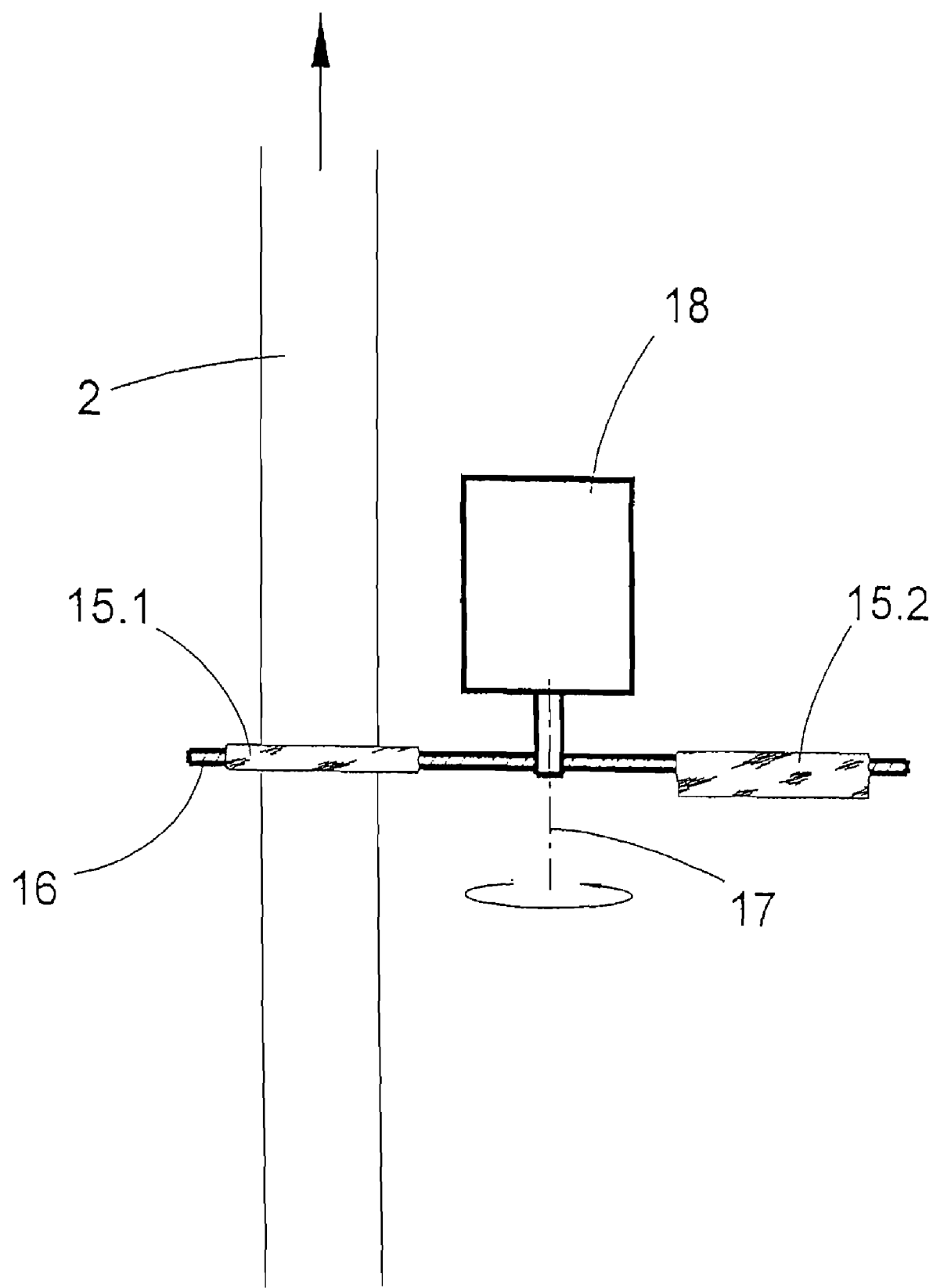
FIG. 2 an exchange wheel for the optical elements.

As is shown in FIG. 2, two optical elements 15.1 and 15.2 are arranged on an exchange wheel 16 for this purpose. The exchange wheel 16 is arranged so as to be rotatable about an axis of rotation 17 aligned parallel with the radiation direction of the laser beam 2 and is coupled with an electromechanical drive 18. For example, the optical element 15.1 can be provided with a microoptic structure which, as was described above, generates a homogeneous intensity distribution in a central area of the beam path and generates an intensity distribution falling in a bell-shaped manner toward the edge regions, while the optical element 15.2 is provided with a microoptic structure which generates an intensity dropping in a Gaussian or bell-shaped manner already immediately proceeding from the center to the edge regions in all directions.

Figure 6:
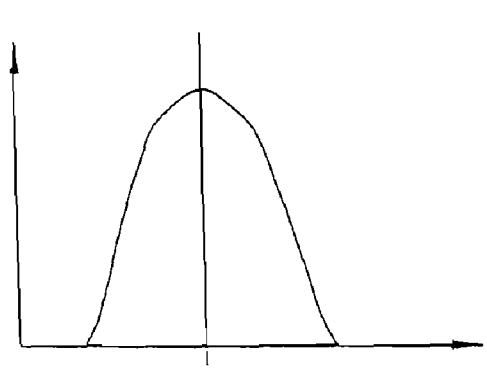
FIG. 6 Gaussian intensity distribution in the beam cross section in the scanning direction.
Figure 7:
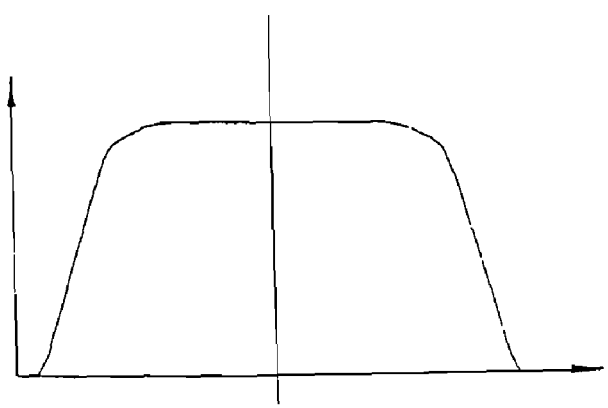
FIG. 7 approximately uniform intensity in the beam cross section perpendicular to the scanning direction.

Alternatively, it can be provided, of course, that additional optical elements 15.1, 15.2 . . . 15.n are arranged on the exchange wheel 16. For example, the optical element 15.n can have a structure by means of which the beam cross section of the laser radiation retains its rectangular shape, but the extension of the cross-sectional area is reduced and, in this respect, the intensity distribution is further homogenized in the section along the longer side of the rectangle, while in the section along the shorter side of the rectangular cross section the beam intensity further approximates the Gaussian distribution. FIG. 6 and FIG. 7 show the intensity distributions within a beam path in two section paths arranged at right angles to one another. Accordingly, FIG. 6 shows the homogenized intensity distribution in a first direction of these two cross-sectional directions; FIG. 7 shows the Gaussian distribution of the second cross-sectional direction oriented at right angles to the first cross-sectional direction. The cross-sectional direction with the Gaussian distribution according to FIG. 7 should advantageously be directed in the same direction as the deflection direction of the laser beam.

If necessary, one of these optical elements 15.1 15.2 . . . 15.n can be selectively introduced into the beam path in that a control pulse is delivered to the drive unit 18 and the drive unit 18 is made to move the exchange wheel 16 by a rotational angle around the axis of rotation 17 corresponding to the arc distance to the desired optical element on the exchange wheel 16.

Further, an objective, e.g., a varifocal lens or variable objective 19, is provided in the beam path of the laser beam 2 of the device described herein. The spot size is predetermined by the objective. When using a variable objective 19, it is possible to vary the size of the spot directed onto the object surface. Accordingly, it is advantageously achieved that, depending on the treatment stage, the spot size can be selected in such a way that either a fine treatment can be carried out over the entire surface to be treated insofar as the spot is adjusted to this size or an intensive treatment of individual small surface portions can be carried out insofar as the spot size is reduced to a smaller expanse.

It is now possible, by means of the device according to the invention, to vary the intensity profile inside the radiation cross section, the size of the laser spot on the surface to be treated and also the deflecting angle. By adapting these three parameters to one another, an effective treatment of the object surface in the broadest sense is possible in all conceivable stages of treatment.

In order that a change in the deflecting angle, in the spot size or in the intensity distribution can be carried out in an uncomplicated manner during treatment or immediately after the treatment of individual surface portions, the variable objective 19 is coupled with a controllable electromechanical drive just like the exchange wheel 16.

Figure 3:
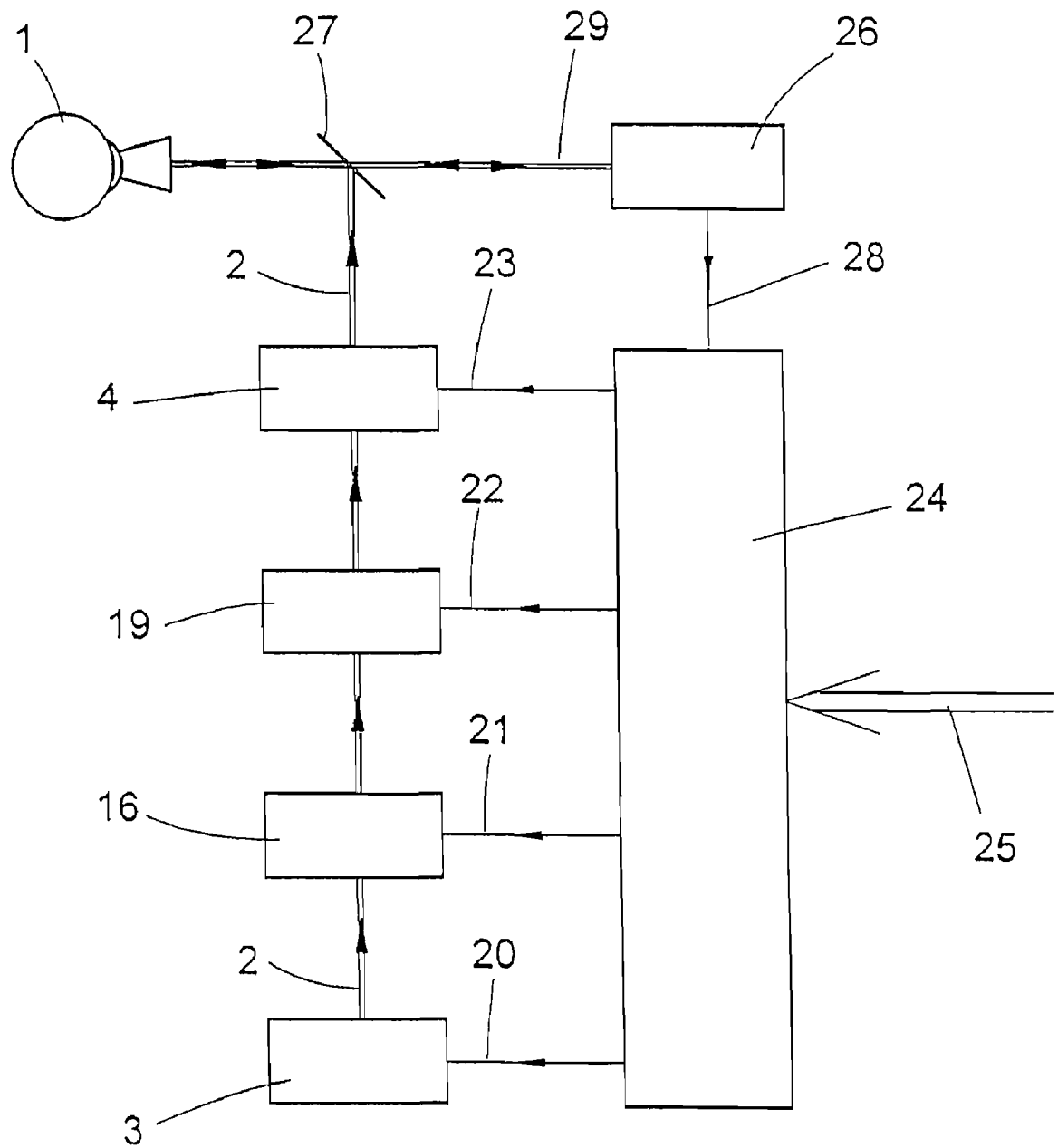
FIG. 3 a block wiring diagram with linking of individual subassemblies.

As is shown schematically in FIG. 3, the exchange wheel 16, variable objective 19 and deflecting device 4 are arranged in the laser beam 2 emanating from the excimer laser 3. The excimer laser 3 is connected with a control unit 24 via a control input 20, the exchange wheel 16 is connected with the control unit 24 via a control input 21, the variable objective 19 is connected with the control unit 24 via a control input 22 and the deflecting device 4 is connected with the control unit 24 via a control input 23.

The control unit 24 is provided with an interface 25 through which actuating values can be entered manually for the following parameters: spot size, deflecting angle and intensity distribution. Depending on the desired intensity distribution, for example, an actuating value is entered for the appropriate advancing of the exchange wheel 16 to introduce into the laser beam path an optical element 15.1 to 15.n associated with this actuating value. Actuating values for the adjustment of the variable objective which correspond to determined spot sizes are entered in an analogous manner.

Further, according to FIG. 3, corresponding to a constructional variant of the invention, a device 26 is provided for detecting actual values of the curvature of individual surface portions or also of the entire surface of the object 1 to be treated. For this purpose, the device 26 is constructed in such a way that curvature values of the surface are determined before, during or after the treatment through topographic measurements. The measurement radiation 29 required for this purpose is coupled into the laser beam 2 on the way toward the object 1 via an optical beam splitter 27, while the light reflected from the object surface is coupled out of the laser beam 2 with the information about the curvature of the surface again by means of the optical splitter 27 and is directed, for example, onto a detector device inside the device 26.

The determined curvature values are sent, via a signal path 28, to the control unit 24 which contains a computation circuit (not shown separately) which determines preset data for the continued treatment of the surface of the object 1 from a comparison with the reference values entered via the interface 25 for the individual parameters (deflecting angle, spot size, intensity distribution) and the determined actual values for the surface curvatures and reads out these preset data via the control inputs 20 to 23.

The process according to the invention for shaping objects through material removal of the object surface by means of a pulsed laser beam and the process for determining geometric changes at the surface of objects during operation of this device can be carried out advantageously with the device which is described herein by way of example.

As was already shown, an essential advantage consists in that after the treatment of individual surface portions a further smoothing of the cornea curvature is possible by corresponding presets for spot size and intensity distribution within the laser radiation. Also, a reduction in treatment time can be achieved through the possibility of ablation over the whole surface area. Accordingly, in addition to the correction of myopia and hyperopia in the human eye, irregularities such as irregular astigmatism can also be corrected in an advantageous manner.

It has also been shown that the formation of so-called central islands which formerly occurred in a troublesome manner in procedures and devices according to the prior art can be prevented in this way.

During use of the device according to the invention, it is recommended that ablation over the surface area is carried out according to the spot scanning principle with spots which extend over a smaller area than the entire surface to be treated, wherein a bell-shaped or Gaussian intensity distribution in the laser beam 2 should be selected. In a next step, the ablation of the surface to be treated is carried out with spots whose size is in the range of the size of the surface to be treated and whose centers are directed to the center of the surface to be treated, wherein the intensity distribution inside the radiation should be selected in such a way that a homogeneous intensity is present in a central area of the beam path and there is an intensity falling in a Gaussian shape on all sides toward the edge regions.

In an alternative procedure, the change in the surface to be treated or the surface portion to be treated can be determined in a first step after a preceding treatment cycle, for which purpose the device 26 is used for determining curvature values. In a further step, intensity distributions, deflection angles and spot sizes are established for the following treatment steps by means of the computing unit inside the control unit 24 as a function of the determined curvature values, sent to the respective subassemblies via the control inputs 20 to 23, the target position is approached by means of the target beam emitted from the laser diode 12 accompanied by visual monitoring and, finally, the excimer laser 3 is put into operation. After a treatment period which is limited in time, the change in the surface to be treated is determined within the scope of a first step and conclusions are derived from this concerning further treatment procedure.

Accordingly, the presence of pronounced curvatures on the surface of the object 1 can advantageously be determined and, for the effective correction thereof, an intensity distribution can be selected within the beam path for the following treatment step which is different from that used in a normal correction of myopia. The possibility of using large and small spots in which intensity distributions having a Gaussian shape or pot shape in the laser beam can be selected or in which a constant intensity distribution is determined in a central area makes possible combination variants by which even extreme surface structures can be corrected optimally or can be newly formed without visually perceptible and therefore bothersome unevenness remaining on the object surface.

The invention claimed is:

1. A device for shaping objects by removal of material from the surface thereof, comprising:
   a pulsed laser beam;
   a deflecting device through which the laser beam is scanned over the surface of the object;
   an optical element configured to alter an intensity distribution of the laser beam so that the laser beam, after passing through the optical element, has a radially symmetric intensity within the laser beam cross section, in which an approximately equal intensity is present in a circular central cross sectional area with the intensity decreasing in a bell-shape or Gaussian shape from the circular central region to edge regions of the laser beam.

2. The device as recited in claim 1, wherein the optical element is configured to be selectively introduced into and removed from a path of the laser beam.

3. The device as recited in claim 1, further comprising a further optical element configured to be selectively introduced into and removed from the path of the laser beam and configured to alter the intensity distribution of the laser beam so that the laser beam, after passing through the further optical element, has a different intensity distribution in two different cross sectional directions through the laser beam.

4. The device as recited in claim 3, wherein the two different cross sectional directions are perpendicular to each other and wherein a first intensity distribution includes a bell-shaped or Gaussian portion and a second intensity distribution is approximately homogeneous.

5. The device as recited in claim 3, wherein the further optical element includes a second microoptically active structure.

6. The device as recited in claim 3, wherein the optical element and the further optical element are disposed on a movable carrier and wherein the optical element and the further optical element can be selectively introduced into the laser beam and removed from the laser beam by a movement of the carrier.

7. The device as recited in claim 6, wherein the movable carrier includes a rotatable exchange wheel mounted so as to be rotatable about an axis of rotation oriented parallel to the beam direction and wherein the optical element and the further optical element are arranged along an arc of a circle.

8. The device as recited in claim 1, wherein the optical element includes a first microoptically active structure.

9. The device as recited in claim 8, wherein the first microoptically active structure is a refractive structure.

10. The device as recited in claim 8, wherein the first microoptically active structure is a diffractive structure.

11. The device as recited in claim 8, wherein the first microoptically active structure is a holographic structure.

12. The device as recited in claim 1, wherein the object includes an eye.

13. The device as recited in claim 1, wherein the pulsed laser beam is an excimer laser beam.

14. The device as recited in claim 1, wherein the deflecting device is configured to deflect the laser beam so that two consecutive pulses overlap as the laser beam is scanned over the surface of the object.

15. The device as recited in claim 14, wherein the two consecutive pulses overlap by approximately 30%.

* * * * *